United States Patent
Wu et al.

(10) Patent No.: US 12,472,729 B2
(45) Date of Patent: Nov. 18, 2025

(54) COMPOSITE NONWOVEN MAT AND METHOD OF MAKING THE SAME

(71) Applicant: Owens Corning Intellectual Capital, LLC, Toledo, OH (US)

(72) Inventors: Jianhui Wu, Westerville, OH (US); Weigang Qi, Westerville, OH (US); Zach Cudzilo, Knoxville, TN (US); Scott Eaton, Mooresville, NC (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 102 days.

(21) Appl. No.: 17/601,155

(22) PCT Filed: Mar. 27, 2020

(86) PCT No.: PCT/US2020/025514
§ 371 (c)(1),
(2) Date: Oct. 4, 2021

(87) PCT Pub. No.: WO2020/210061
PCT Pub. Date: Oct. 15, 2020

(65) Prior Publication Data
US 2022/0212455 A1 Jul. 7, 2022

Related U.S. Application Data (60) Provisional application No. 62/830,901, filed on Apr. 8, 2019.

(51) Int. Cl.
*B32B 27/12* (2006.01)
*B32B 5/02* (2006.01)
(Continued)

(52) U.S. Cl.
CPC .............. *B32B 27/12* (2013.01); *B32B 5/022* (2013.01); *B32B 5/18* (2013.01); *B32B 5/245* (2013.01);
(Continued)

(58) Field of Classification Search
CPC .......... B32B 27/12; B32B 5/022; B32B 5/18; B32B 5/245; B32B 27/20; B32B 27/32;
(Continued)

(56) References Cited

U.S. PATENT DOCUMENTS

| | | | |
|---|---|---|---|
| 5,914,282 A | 6/1999 | Dunshee et al. | |
| 6,133,168 A | 10/2000 | Doyle et al. | |

(Continued)

FOREIGN PATENT DOCUMENTS

| | | | |
|---|---|---|---|
| CN | 1867721 A | 11/2006 | |
| CN | 104018615 A | 9/2014 | |

(Continued)

OTHER PUBLICATIONS

Translation for Yamada et al, JP 2015030226 A. (Year: 2015).*
(Continued)

*Primary Examiner* — Nathan L Van Sell
(74) *Attorney, Agent, or Firm* — Calfee, Halter & Griswold LLP (57) ABSTRACT

A composite nonwoven mat and a method of making a composite nonwoven mat are provided. The composite nonwoven mat includes a nonwoven base layer having a first surface and a second surface, and a polymer layer formed on and adhered to the first surface of the nonwoven base layer. The polymer layer extends partially into the nonwoven base layer. The composite nonwoven mat has an average Gurley porosity of at least 2,000 seconds.

8 Claims, 2 Drawing Sheets

(51) Int. Cl.
*B32B 5/18* (2006.01)
*B32B 5/24* (2006.01)
*B32B 27/20* (2006.01)
*B32B 27/32* (2006.01)
*B32B 37/04* (2006.01)

(52) U.S. Cl.
CPC .............. *B32B 27/20* (2013.01); *B32B 27/32* (2013.01); *B32B 37/04* (2013.01); *B32B 2262/101* (2013.01); *B32B 2266/0214* (2013.01); *B32B 2307/3065* (2013.01); *B32B 2307/4026* (2013.01); *B32B 2307/718* (2013.01); *B32B 2471/04* (2013.01)

(58) Field of Classification Search
CPC .............. B32B 37/04; B32B 2262/101; B32B 2266/0214; B32B 2307/3065; B32B 2307/4026; B32B 2307/718; B32B 2471/04; B32B 2255/02; B32B 2255/26; B32B 2307/732; B32B 27/281; B32B 27/34; B32B 27/40
See application file for complete search history.

(56) References Cited

U.S. PATENT DOCUMENTS

| | | | |
|---|---|---|---|
| 6,300,257 B1 | 10/2001 | Kirchberger et al. | |
| 6,410,465 B1 | 6/2002 | Lim et al. | |
| 7,309,665 B2 | 12/2007 | Qureshi et al. | |
| 7,316,839 B2 | 1/2008 | Knauf | |
| 7,338,698 B1 | 3/2008 | Bieser et al. | |
| 7,501,357 B2 | 3/2009 | Carroll et al. | |
| 7,772,137 B2 | 8/2010 | Jones | |
| 7,972,981 B2 | 7/2011 | Anderson et al. | |
| 8,163,664 B2 | 4/2012 | Weller, Jr. | |
| 8,168,853 B2 | 5/2012 | Autran et al. | |
| 8,323,770 B2 | 12/2012 | Mehta et al. | |
| 8,403,108 B2 | 3/2013 | Bliton et al. | |
| 8,536,077 B2 | 9/2013 | Lavietes et al. | |
| 8,828,487 B2 | 9/2014 | Todt et al. | |
| 8,946,101 B2 | 2/2015 | Moulton et al. | |
| 8,969,222 B2 | 3/2015 | Keese et al. | |
| 9,029,277 B2 | 5/2015 | Ngai | |
| 9,096,036 B2 | 8/2015 | Hauber et al. | |
| 9,096,790 B2 | 8/2015 | Mccrary et al. | |
| 9,475,265 B2 | 10/2016 | Elia et al. | |
| 9,809,011 B1 | 11/2017 | Puppin | |
| 9,849,602 B2 | 12/2017 | Cree | |
| 9,885,647 B2 | 2/2018 | Grubb et al. | |
| 10,087,575 B2 | 10/2018 | Tynys et al. | |
| 10,160,191 B2 | 12/2018 | Fay et al. | |
| 2002/0106959 A1 | 8/2002 | Huffines et al. | |
| 2002/0132547 A1 | 9/2002 | Grondin et al. | |
| 2002/0136862 A1 | 9/2002 | Dong et al. | |
| 2002/0168503 A1* | 11/2002 | Dong ............... | B32B 21/08 442/385 |
| 2003/0129903 A1 | 7/2003 | Moes | |
| 2004/0029469 A1 | 2/2004 | Anderson et al. | |
| 2004/0116022 A1 | 6/2004 | Langley et al. | |
| 2004/0122396 A1 | 6/2004 | Maldonado et al. | |
| 2004/0161993 A1* | 8/2004 | Tripp ............... | C04B 26/02 442/364 |
| 2004/0192141 A1* | 9/2004 | Yang ............... | C04B 26/02 442/364 |
| 2005/0003174 A1 | 1/2005 | Ikeda et al. | |
| 2005/0003722 A1 | 1/2005 | James et al. | |
| 2005/0014431 A1 | 1/2005 | Carmody et al. | |
| 2005/0098255 A1 | 5/2005 | Lembo et al. | |
| 2005/0281970 A1 | 12/2005 | Lamarca et al. | |
| 2006/0193995 A1 | 8/2006 | Yong | |
| 2008/0176050 A1 | 7/2008 | Lintz et al. | |
| 2011/0027571 A1 | 2/2011 | Wakeman et al. | |
| 2011/0135899 A1 | 6/2011 | Meltzer et al. | |
| 2013/0029550 A1 | 1/2013 | Seth et al. | |
| 2015/0064433 A1 | 3/2015 | Foster et al. | |
| 2015/0308039 A1 | 10/2015 | Bonaboglia et al. | |
| 2016/0273140 A1* | 9/2016 | Wu ............... | D21H 17/56 |
| 2016/0333517 A1 | 11/2016 | Zhang et al. | |
| 2016/0369509 A1 | 12/2016 | Leitch et al. | |
| 2017/0002564 A1 | 1/2017 | Peet et al. | |
| 2017/0015042 A1 | 1/2017 | Leitch et al. | |
| 2017/0282510 A1 | 10/2017 | Peet et al. | |
| 2017/0341337 A1 | 11/2017 | Kirkwood et al. | |
| 2017/0348725 A1 | 12/2017 | Cho et al. | |
| 2018/0250910 A1 | 9/2018 | Lunsford | |
| 2018/0251619 A1 | 9/2018 | Shinohara et al. | |
| 2018/0304602 A1 | 10/2018 | Perez et al. | |

FOREIGN PATENT DOCUMENTS

| | | |
|---|---|---|
| DE | 102017003362 A1 | 10/2018 |
| EP | 0955158 B1 | 7/2003 |
| EP | 1462559 A1 | 9/2004 |
| EP | 1662044 A2 | 5/2006 |
| EP | 2191961 A2 | 6/2010 |
| WO | 2017120611 A1 | 7/2017 |
| WO | 2017165870 A1 | 9/2017 |
| WO | 2018094197 A1 | 5/2018 |
| WO | 2018094199 A1 | 5/2018 |
| WO | 2018129669 A1 | 7/2018 |

OTHER PUBLICATIONS

Office Action from EP Application No. 20720673.1 dated Jan. 12, 2023.
Office Action from IN Application No. 202137044169 dated Aug. 2, 2023.
Office Action from CN Application No. 202080035443.8 dated May 8, 2023.
Office Action from CN Application No. 202080035443.8 dated Dec. 27, 2023.
Office Action from TW Application No. 109111368 dated Oct. 25, 2023.
Office Action from CN Application No. 202080035443.8 dated Jun. 19, 2024.
Office Action from TW Application No. 109111368 dated Jun. 20, 2024.
Office Action from CA Application No. 3,136,325 dated Feb. 12, 2025.

* cited by examiner

COMPOSITE NONWOVEN MAT AND METHOD OF MAKING THE SAME

CROSS-REFERENCE TO RELATED APPLICATIONS

This application is the U.S. national stage entry of PCT/US2020/025514, filed Mar. 27, 2020, which claims priority to and the benefit of U.S. Provisional Patent Application No. 62/830,901, filed Apr. 8, 2019, the entire disclosures of which are incorporated herein by reference in full.

FIELD

The general inventive concepts relate to nonwoven mats and, more particularly, to a composite nonwoven mat that includes a nonwoven base layer and a polymer layer. The composite nonwoven mat may be used in a variety of different applications and products, such as a backing or substrate for flooring products and as a facer for polyisocyanurate foam boards.

BACKGROUND

Conventional nonwoven mats include a fibrous web bound together by a suitable resinous binder. The fibrous web may include glass fibers. Glass fibers provide dimensional stability as they generally do not shrink or stretch in response to changes in atmospheric conditions. Further, glass fibers have high tensile strength, heat resistance, moisture resistance, and thermal conductivity.

Conventional nonwoven mats generally have a porous structure such that materials, particularly liquid materials, applied to the nonwoven mats tend to bleed through from one surface of the nonwoven mat to the opposing surface of the nonwoven mat. In certain applications, it may be desirable to utilize a nonwoven mat, but the porous structure of the nonwoven mat may be undesirable due to bleed-through.

SUMMARY

The general inventive concepts relate to a composite nonwoven mat that includes a nonwoven base layer and a polymer layer, and a method of making such a composite nonwoven mat. To illustrate various aspects of the general inventive concepts, several exemplary embodiments of composite nonwoven mats and methods of making the composite nonwoven mats are disclosed.

In one exemplary embodiment, a composite nonwoven mat is provided. The composite nonwoven mat includes a nonwoven base layer having a first surface and a second surface, and a polymer layer adhered to the first surface of the nonwoven base layer. The polymer layer extends partially into the nonwoven base layer. The composite nonwoven mat has an average Gurley porosity of at least 1,000 seconds.

In one exemplary embodiment, a method of making a composite nonwoven mat is provided. The method includes the steps of: a) conveying a nonwoven base layer having a first surface and a second surface; b) applying a molten polymer onto the first surface of the nonwoven base layer as the nonwoven base layer is being conveyed; c) allowing the molten polymer to form a polymer layer on the first surface of the nonwoven base layer, thereby forming a composite nonwoven mat; and d) collecting the composite nonwoven mat.

Other aspects, advantages, and features of the general inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts relate to a composite nonwoven mat and methods of making a composite nonwoven mat. The composite nonwoven mat generally includes a polymer layer that provides an impervious (e.g., water impervious) barrier such that when a material, particularly a liquid material, is applied to a surface of the composite nonwoven mat opposite the polymer layer, the material is prevented from passing through the composite nonwoven mat by the polymer layer.

Figure 1:
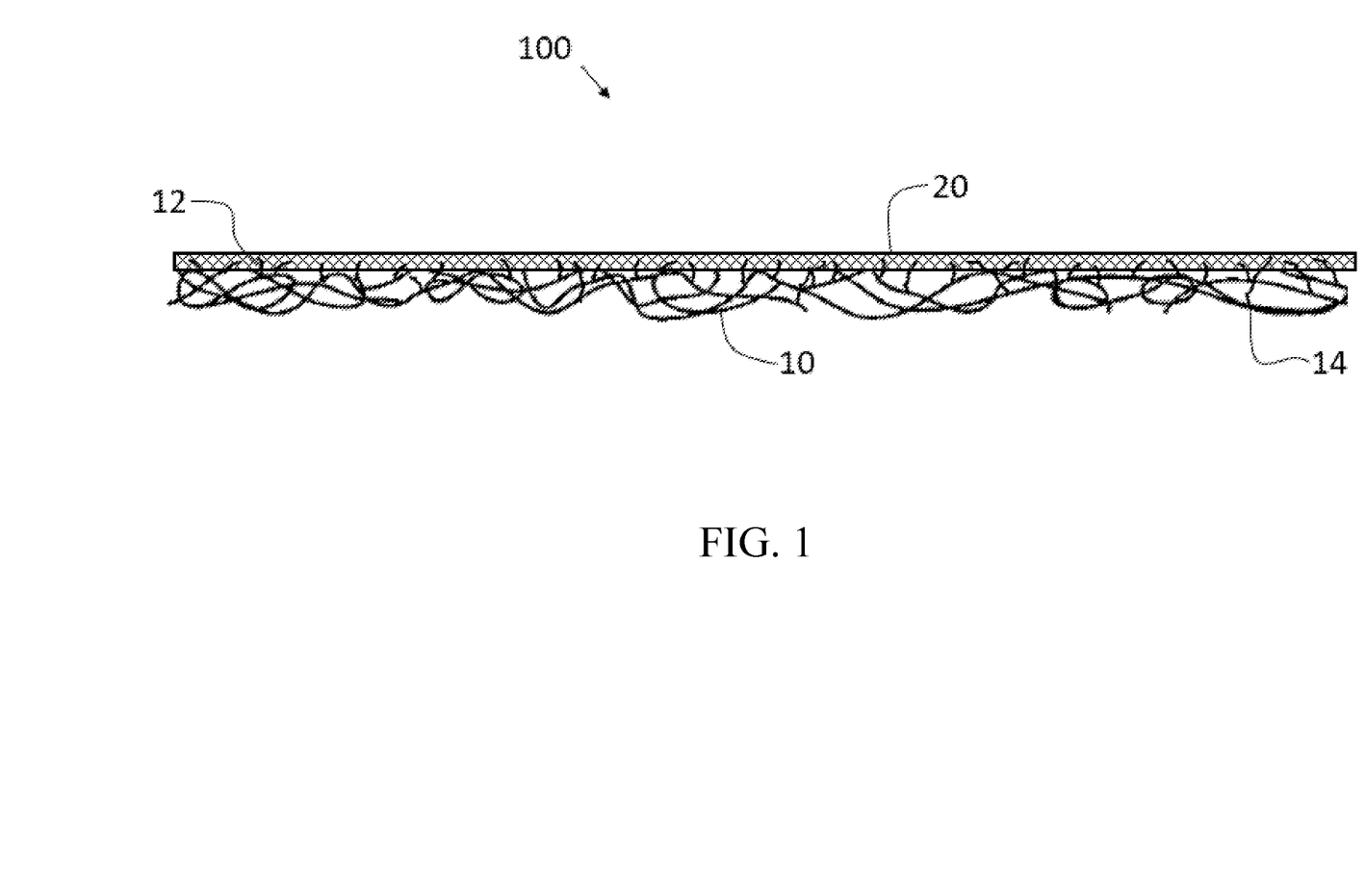
FIG. 1 is a cross-sectional view of an exemplary embodiment of a composite nonwoven mat of the present disclosure.

In one exemplary embodiment, a composite nonwoven mat 100 is provided. Referring to FIG. 1, the composite nonwoven mat 100 comprises a nonwoven base layer 10 having a first surface 12 and a second surface 14. Adhered to the first surface 12 of the nonwoven base layer 10 is a polymer layer 20. As seen in FIG. 1, the polymer layer 20 extends partially into the nonwoven base layer 10 (i.e., partially through a thickness of the nonwoven base layer 10 measured from the first surface 12 to the second surface 14). The composite nonwoven mat 100 of the present disclosure generally has an average Gurley porosity of at least 2,000 seconds.

The nonwoven base layer 10 of the present disclosure may be formed by a variety of processes, including wet-laid processes and dry-laid processes. In certain embodiments, the nonwoven base layer 10 is formed by a wet-laid process, which involves forming an aqueous dispersion or slurry of discrete fibers in a mix tank filled with various components (sometimes referred to as white water), such as water, surfactants, viscosity modifiers, defoaming agents, lubricants, biocides, and/or other chemical agents, along with agitation, to form a chopped glass fiber slurry. It is desirable that the slurry is agitated sufficiently to provide a uniform or nearly uniform dispersion of fibers.

The aqueous fiber dispersion or slurry may then be processed into a wet-laid mat according to any number of conventional methods known in the art. For example, the aqueous fiber slurry is deposited onto a moving screen or conveyor, on which the majority of the water drains through, leaving a randomly oriented fiber web. The fiber web may be further dried by a vacuum slot or other drying means. A binder composition may then be applied to the fiber web in a conventional manner, such as by curtain coating, spraying, twin wire dip bath, two roll padder, and the like. Water and excess binder composition may then be removed by a vacuum or other water removal means. Finally, the binder-coated fiber product may be dried and cured in one or more ovens. An exemplary temperature range for drying is from 350° F. (177° C.) to 600° F. (316° C.). The dried and cured product is the finished nonwoven base layer 10.

The nonwoven base layer 10 of the present disclosure may be formed from a variety of materials. In general, the nonwoven base layer 10 comprises a plurality of fibers and a binder composition that binds the fibers together. Exemplary fibers for forming the nonwoven base layer 10 include, but are not limited to, glass fibers, synthetic fibers (e.g., polyester fibers, polyethylene fibers, polypropylene fibers, polyethylene terephthalate fibers, polyamide fibers, aramid fibers, polyaramid fibers), mineral fibers, carbon fibers, ceramic fibers, natural fibers (e.g., cellulose fibers, cotton fibers, jute fibers, bamboo fibers, ramie fibers, bagasse fibers, hemp fibers, coir fibers, linen fibers, kenaf fibers, sisal fibers, flax fibers, henequen fibers), or a blend of two or more different types of fibers.

In certain embodiments, the nonwoven base layer 10 comprises glass fibers. The glass fibers can be made from any type of glass. Exemplary glass fibers include, but are not limited to, A-type glass fibers, C-type glass fibers, E-type glass fibers, S-type glass fibers, ECR-type glass fibers (e.g., Advantex® glass fibers commercially available from Owens Corning of Toledo, Ohio), Hiper-tex® glass fibers, wool glass fibers, and combinations thereof.

The glass fibers used to form the nonwoven base layer 10 may have a variety of fiber diameters. In certain embodiments, the glass fibers used to form the nonwoven base layer 10 have an average fiber diameter of 6.5 microns to 20 microns. In certain embodiments, the glass fibers used to form the nonwoven base layer 10 have an average fiber diameter of 10 microns to 18 microns. In certain other embodiments, the glass fibers used to form the nonwoven base layer 10 have an average fiber diameter of 13 microns to 16 microns. It is also contemplated that a blend of glass fibers having different fiber diameters, such as a blend of smaller diameter glass fibers (e.g., average fiber diameter of 6.5 microns to 10 microns) and larger diameter glass fibers (e.g., average fiber diameter of 13 microns to 16 microns), may be used to form the nonwoven base layer 10.

The glass fibers used to form the nonwoven base layer 10 may also have a variety of fiber lengths. In certain embodiments, the glass fibers used to form the nonwoven base layer 10 have an average fiber length of 0.25 inches (6.35 mm) to 2 inches (50.8 mm). In certain embodiments, the glass fibers used to form the nonwoven base layer 10 have an average fiber length of 0.5 inches (12.7 mm) to 1.5 inches (38.1 mm). In certain other embodiments, the glass fibers used to form the nonwoven base layer 10 have an average fiber length of 0.75 inches (19.05 mm) to 1 inch (25.4 mm). It is also contemplated that a blend of glass fibers having different fiber lengths, such as a blend of shorter glass fibers (e.g., average fiber length of 0.25 inches (6.35 mm) to 0.5 inches (12.7 mm)) and longer glass fibers (e.g., average fiber length of 0.75 inches (19.05 mm) to 1.25 inches (31.75 mm)), may be used to form the nonwoven base layer 10.

In certain embodiments, the nonwoven base layer 10 comprises glass fibers and synthetic fibers. Any of the previously described glass fibers may be used in combination with synthetic fibers to form the nonwoven base layer 10. The synthetic fibers may comprise one or more of polyester fibers, polyethylene fibers, polypropylene fibers, polyethylene terephthalate fibers, polyamide fibers, aramid fibers, and polyaramid fibers. In certain embodiments, the nonwoven base layer 10 comprises from 50% to 99% by weight glass fibers and from 1% to 50% by weight synthetic fibers, with the weight percentages based on the total weight of fibers. In certain embodiments, the nonwoven base layer 10 comprises from 70% to 99% by weight glass fibers and from 1% to 30% by weight synthetic fibers, including from 75% to 99% by weight glass fibers and from 1% to 25% by weight synthetic fibers, from 80% to 99% by weight glass fibers and from 1% to 20% by weight synthetic fibers, from 85% to 99% by weight glass fibers and from 1% to 15% by weight synthetic fibers, from 90% to 99% by weight glass fibers and from 1% to 10% by weight synthetic fibers, and also including from 95% to 99% by weight glass fibers and from 1% to 5% by weight synthetic fibers, with the weight percentages based on the total weight of fibers.

The synthetic fibers used to form the nonwoven base layer 10 may have a variety of fiber diameters. In certain embodiments, the synthetic fibers used to form the nonwoven base layer 10 have an average fiber diameter of 3 microns to 20 microns. In certain embodiments, the synthetic fibers used to form the nonwoven base layer 10 have an average fiber diameter of 5 microns to 15 microns. In certain other embodiments, the synthetic fibers used to form the nonwoven base layer 10 have an average fiber diameter of 5 microns to 10 microns. It is also contemplated that a blend of synthetic fibers having different fiber diameters, such as a blend of smaller diameter synthetic fibers (e.g., average fiber diameter of 3 microns to 10 microns) and larger diameter synthetic fibers (e.g., average fiber diameter of 12 microns to 20 microns), may be used in forming the nonwoven base layer 10.

The synthetic fibers used to form the nonwoven base layer 10 may also have a variety of fiber lengths. In certain embodiments, the synthetic fibers used to form the nonwoven base layer 10 have an average fiber length of 1 mm to 25.4 mm. In certain embodiments, the synthetic fibers used to form the nonwoven base layer 10 have an average fiber length of 2 mm to 20 mm, including, an average fiber length of 2 mm to 13 mm, an average fiber length of 2 mm to 10 mm, and also including an average fiber length of 2 mm to 6 mm. It is also contemplated that a blend of synthetic fibers having different fiber lengths, such as a blend of shorter synthetic fibers (e.g., average fiber length of 2 mm to 6 mm) and longer synthetic fibers (e.g., average fiber length of 12 mm to 25.4 mm), may be used in forming the nonwoven base layer 10.

In certain embodiments, the nonwoven base layer 10 comprises from 70% to 99% by weight glass fibers and from 1% to 30% by weight polyester fibers, including from 75% to 99% by weight glass fibers and from 1% to 25% by weight polyester fibers, from 80% to 99% by weight glass fibers and from 1% to 20% by weight polyester fibers, from 85% to 99% by weight glass fibers and from 1% to 15% by weight polyester fibers, from 90% to 99% by weight glass fibers and from 1% to 10% by weight polyester fibers, and also including from 95% to 99% by weight glass fibers and from 1% to 5% by weight polyester fibers, with the weight percentages based on the total weight of fibers. In certain of the foregoing embodiments, the glass fibers used to form the nonwoven base layer 10 have an average fiber diameter of 13 microns to 16 microns and an average fiber length of 12.7 mm to 38.1 mm, and the polyester fibers used to form the nonwoven base layer 10 have an average fiber diameter of 5 microns to 10 microns and an average fiber length of 2 mm to 10 mm.

In certain embodiments, the nonwoven base layer 10 comprises glass fibers and natural fibers. Any of the previously described glass fibers may be used in combination with natural fibers to form the nonwoven base layer 10. The natural fibers may comprise one or more of cellulose fibers, cotton fibers, jute fibers, bamboo fibers, ramie fibers, bagasse fibers, hemp fibers, coir fibers, linen fibers, kenaf fibers, sisal fibers, flax fibers, and henequen fibers. In certain embodiments, the nonwoven base layer 10 comprises from 50% to 99% by weight glass fibers and from 1% to 50% by weight natural fibers, with the weight percentages based on the total weight of fibers. In certain embodiments, the nonwoven base layer 10 comprises from 70% to 99% by weight glass fibers and from 1% to 30% by weight natural fibers, including from 75% to 99% by weight glass fibers and from 1% to 25% by weight natural fibers, from 80% to 99% by weight glass fibers and from 1% to 20% by weight natural fibers, from 85% to 99% by weight glass fibers and from 1% to 15% by weight natural fibers, from 90% to 99% by weight glass fibers and from 1% to 10% by weight natural fibers, and also including from 95% to 99% by weight glass fibers and from 1% to 5% by weight natural fibers, with the weight percentages based on the total weight of fibers.

The natural fibers used to form the nonwoven base layer 10 may have a variety of fiber diameters. In certain embodiments, the natural fibers used to form the nonwoven base layer 10 have an average fiber diameter of 5 microns to 45 microns. In certain embodiments, the natural fibers used to form the nonwoven base layer 10 have an average fiber diameter of 10 microns to 45 microns, including from 15 microns to 45 microns, from 25 microns to 45 microns, and also including from 30 microns to 40 microns. It is also contemplated that a blend of natural fibers having different fiber diameters, such as a blend of smaller diameter natural fibers (e.g., average fiber diameter of 5 microns to 15 microns) and larger diameter natural fibers (e.g., average fiber diameter of 30 microns to 45 microns), may be used in forming the nonwoven base layer 10.

The natural fibers used to form the nonwoven base layer 10 may also have a variety of fiber lengths. In certain embodiments, the natural fibers used to form the nonwoven base layer 10 have an average fiber length of 1 mm to 25.4 mm. In certain embodiments, the natural fibers used to form the nonwoven base layer 10 have an average fiber length of 1 mm to 20 mm, including, an average fiber length of 1 mm to 13 mm, an average fiber length of 1 mm to 10 mm, and also including an average fiber length of 1 mm to 6 mm. It is also contemplated that a blend of natural fibers having different fiber lengths, such as a blend of shorter natural fibers (e.g., average fiber length of 1 mm to 6 mm) and longer natural fibers (e.g., average fiber length of 12 mm to 25.4 mm), may be used in forming the nonwoven base layer 10.

In certain embodiments, the nonwoven base layer 10 comprises from 70% to 99% by weight glass fibers and from 1% to 30% by weight cellulose fibers, including from 75% to 99% by weight glass fibers and from 1% to 25% by weight cellulose fibers, from 80% to 99% by weight glass fibers and from 1% to 20% by weight cellulose fibers, from 85% to 99% by weight glass fibers and from 1% to 15% by weight cellulose fibers, from 90% to 99% by weight glass fibers and from 1% to 10% by weight cellulose fibers, and also including from 95% to 99% by weight glass fibers and from 1% to 5% by weight cellulose fibers, with the weight percentages based on the total weight of fibers. In certain of the foregoing embodiments, the glass fibers used to form the nonwoven base layer 10 have an average fiber diameter of 13 microns to 16 microns and an average fiber length of 12.7 mm to 38.1 mm, and the cellulose fibers used to form the nonwoven base layer 10 have an average fiber diameter of 30 microns to 40 microns and an average fiber length of 1 mm to 6 mm.

As mentioned above, the nonwoven base layer 10 also includes a binder composition to bind the fibers of the nonwoven base layer 10 together. Any conventional binder composition used to form nonwoven mats may be used to form the nonwoven base layer 10 of the present disclosure. In certain embodiments, the binder composition comprises a binder resin material, a coupling agent, and one or more optional additives. The binder resin may be a thermoset material, a thermoplastic material, or a mixture of a thermoset material and a thermoplastic material. The thermoset material may comprise, for example, an acrylic material, a urea formaldehyde material, or a combination of the two materials. In some exemplary embodiments, the acrylic material is polyacrylic acid, such as low molecular weight polyacrylic acid with a weight average molecular weight at or below 10,000 Daltons. The thermoset material, once cross-linked under proper curing conditions, provides good tensile performance and solvent resistance, helping maintain mat integrity in different applications. In certain embodiments, the thermoplastic material may include any thermoplastic material having a low glass transition temperature (e.g., below −15° C.), for example, ethylene vinyl acetate.

In certain embodiments, the nonwoven base layer 10 comprises from 1% to 30% by weight binder composition, based on the total weight of the nonwoven base layer 10. In certain embodiments, the nonwoven base layer 10 comprises from 5% to 30% by weight binder composition, including from 10% to 30% by weight binder composition, and also including from 15% to 25% by weight binder composition, based on the total weight of the nonwoven base layer 10. As one of skill in the art will appreciate, the amount of binder composition used to form the nonwoven base layer 10 may be determined by loss on ignition.

In certain embodiments, the binder resin may be present in the binder composition in an amount of 90% to 99% based on the total weight of the binder composition. In certain other embodiments, the binder resin may be present in the binder composition in an amount of 97% to 99% based on the total weight of the binder composition.

The binder composition may further include a coupling agent. It is to be appreciated that the coupling agents described herein are exemplary in nature, and any suitable coupling agent known to those of ordinary skill in the art may be utilized in any of the exemplary embodiments described or otherwise suggested herein. In certain embodiments, the coupling agent, or coupling agents, may be present in the binder composition in an amount of 0.05% to 10% based on the total weight of the binder composition. In certain embodiments, the coupling agent, or coupling agents, may be present in the binder composition in an amount of 0.1% to 3% based on the total weight of the binder composition. In certain embodiments, the coupling agent, or coupling agents, may be present in the binder composition in an amount of 0.1% to 0.5% based on the total weight of the binder composition.

In certain embodiments, at least one of the coupling agents is a silane coupling agent. Suitable silane coupling agents may include silanes containing one or more nitrogen atoms that have one or more functional groups such as amine (primary, secondary, tertiary, and quaternary), amino, imino, amido, imido, ureido, or isocyanato. Suitable silane coupling agents may also include, but are not limited to, aminosilanes, silane esters, vinyl silanes, methacryloxy silanes, epoxy silanes, sulfur silanes, ureido silanes, and isocyanato silanes. Specific, non-limiting examples of silane coupling agents for use in the instant invention include γ-methacryloxypropyl-trimethoxysilane (A-174), γ-aminopropyltriethoxysilane (A-1100), n-phenyl-γ-aminopropylt-rimethoxysilane (Y-9669), n-trimethoxy-silyl-propyl-ethyl-ene-diamine (A-1120), methyl-trichlorosilane (A-154), γ-chloropropyl-trimethoxy-silane (A-143), vinyl-triacetox-ysilane (A-188), and methyltrimethoxysilane (A-1630).

The binder composition used to form the nonwoven base layer 10 of the present disclosure may optionally include additional components such as, for example, dyes, oils, fillers, colorants, aqueous dispersions, UV stabilizers, lubricants, wetting agents, surfactants, viscosity modifiers, and/or antistatic agents. Such additives may be included in the binder composition in an amount of 0% percent to 10% based on the total weight of the binder composition.

In certain embodiments, the binder composition used to form the nonwoven base layer 10 of the present disclosure may include water to dissolve or disperse the functional components for application onto the fibers. Water may be added in an amount sufficient to dilute the aqueous binder composition to a viscosity that is suitable for its application to the fibers.

The nonwoven base layer 10 of the present disclosure may have a wide range of basis weights. In certain embodiments, the nonwoven base layer 10 has a basis weight of 25 $g/m^2$ to 300 $g/m^2$. In certain other embodiments, the nonwoven base layer 10 has a basis weight of 30 $g/m^2$ to 200 $g/m^2$. In still other embodiments, the nonwoven base layer 10 has a basis weight of 40 $g/m^2$ to 150 $g/m^2$, including a basis weight of 50 $g/m^2$ to 100 $g/m^2$, a basis weight of 50 $g/m^2$ to 80 $g/m^2$, and also including a basis weight of 60 $g/m^2$ to 80 $g/m^2$.

The nonwoven base layer 10 of the present disclosure may also have a variety of thicknesses. In certain embodiments, the nonwoven base layer 10 has a thickness of 0.25 mm to 2 mm. In certain other embodiments, the nonwoven base layer 10 has a thickness of 0.3 mm to 0.7 mm. In still other embodiments, the nonwoven base layer 10 has a thickness of 0.3 mm to 0.6 mm. In certain embodiments, the nonwoven base layer 10 has a thickness of 0.75 mm to 2 mm, including a thickness of 1 mm to 2 mm, a thickness of 1.25 mm to 1.9 mm, and also including a thickness of 1.5 mm to 1.8 mm.

Referring again to FIG. 1, the composite nonwoven mat 100 includes a polymer layer 20 adhered to the first surface 12 of the nonwoven base layer 10. The polymer layer 20 is preferably applied to the first surface 12 of the nonwoven base layer 10 using an extrusion coating process, as described in further detail below.

As seen in FIG. 1, the polymer layer 20 extends partially into the nonwoven base layer 10 (i.e., partially through a thickness of the nonwoven base layer 10 measured from the first surface 12 to the second surface 14). The polymer layer 20 is mechanically adhered or locked to the fibers of the nonwoven base layer 10 as a result of being applied to the nonwoven base layer 10 in a molten, flowable form and subsequently solidifying. In certain embodiments, the polymer layer 20 may extend into the nonwoven base layer 10 in an amount of up to 75% of the thickness of nonwoven base layer 10 (measured from the first surface 12 to the second surface 14). In certain embodiments, the polymer layer 20 may extend into the nonwoven base layer 10 in an amount of up to 50% of the thickness of nonwoven base layer 10 (measured from the first surface 12 to the second surface 14). In certain embodiments, the polymer layer 20 may extend into the nonwoven base layer 10 in an amount of 10% to 50% of the thickness of nonwoven base layer 10 (measured from the first surface 12 to the second surface 14), and also including from 5% to 25% of the thickness of nonwoven base layer 10 (measured from the first surface 12 to the second surface 14). In certain embodiments, the second surface 14 of the nonwoven base layer 10 is free of the polymer layer 20. It should be appreciated that the thickness to which the polymer layer 20 extends into the nonwoven base layer 10 may vary somewhat along the width and/or length of the nonwoven base layer 10.

A variety of polymer materials may be used to form the polymer layer 20 of the present disclosure. The polymer materials may be homopolymers or copolymers obtained from a variety of monomers. In certain embodiments, the polymer layer 20 comprises one or more of a polyolefin, a polyester, a polyamide, a polyimide, a polyacrylate, and a polyurethane. In certain embodiments, the polymer layer 20 comprises one or more of a polyethylene, a polypropylene, and a polymethacrylate. In certain embodiments, the polymer layer 20 comprises a polyethylene selected from high-density polyethylene, medium-density polyethylene, linear low-density polyethylene, low-density polyethylene, very-low-density polyethylene, and combinations thereof. The polymer materials used to form the polymer layer 20 of the present disclosure may also include blends of various homopolymers, copolymers, or both homopolymers and copolymers.

In addition to the polymer material, the polymer layer 20 of the present disclosure may optionally include one or more additives. Exemplary additives include, but are not limited to, fire retardants, dyes, pigments, UV stabilizers, anti-static agents, fillers, and so forth. Such additives are well known by those of ordinary skill in the art. Generally, any such additives used in the polymer layer 20 will typically represent less than 3% by weight of the polymer layer 20. Accordingly, the polymer material will typically represent at least 97% by weight of the polymer layer 20, including 100% by weight of the polymer layer 20. In certain embodiments, the polymer layer 20 of the present disclosure includes a fire retardant. In certain embodiments, the polymer layer 20 of the present disclosure includes a dye and/or pigment to impart to the polymer layer 20 a desired color.

The polymer layer 20 of the present disclosure may have a wide range of basis weights. In certain embodiments, the polymer layer 20 has a basis weight of 10 $g/m^2$ to 100 $g/m^2$. In certain other embodiments, the polymer layer 20 has a basis weight of 10 $g/m^2$ to 80 $g/m^2$. In still other embodiments, the polymer layer 20 has a basis weight of 15 $g/m^2$ to 50 $g/m^2$, including a basis weight of 20 $g/m^2$ to 40 $g/m^2$, and also including a basis weight of 25 $g/m^2$ to 35 $g/m^2$.

The polymer layer 20 of the present disclosure may also have a variety of thicknesses. In certain embodiments, the polymer layer 20 has a thickness of 1 micron to 300 microns. In certain other embodiments, the polymer layer 20 has a thickness of 5 microns to 150 microns. In still other embodiments, the polymer layer 20 has a thickness of 10 microns to 100 microns.

The polymer layer 20 functions to close off or seal one surface of the composite nonwoven mat 100 of the present disclosure. Thus, the composite nonwoven mat 100 of the present disclosure includes one surface that is porous and permits wetting or penetration by a liquid/flowable material and an opposing surface that is sealed to prevent bleed-through of the liquid/flowable material.

Due to the closed-off or sealed surface provided by the polymer layer 20, the composite nonwoven mat 100 is generally impervious. The impervious nature of the composite nonwoven mat 100 of the present disclosure may be characterized by its Gurley porosity. Gurley porosity is a measure of the resistance of a material to air permeability. It may be measured in accordance with TAPPI T-460 (Gurley method), or similar methods. This test measures the time required for 100 cubic centimeters of air to be pushed through an approximately 6.45 cm$^2$ (1 in$^2$) circular area of sample under a pressure of approximately 1.22 kPa. The result is expressed in seconds and is frequently referred to as Gurley seconds. As the Gurley porosity increases, permeability decreases, and as Gurley porosity decreases, permeability increases. The composite nonwoven mat 100 of the present disclosure generally has an average Gurley porosity of at least 1,000 seconds. In certain embodiments, the composite nonwoven mat 100 of the present disclosure has an average Gurley porosity of 1,000 seconds to 30,000 seconds, including an average Gurley porosity of 2,000 seconds to 27,500 seconds, an average Gurley porosity of 5,000 seconds to 25,000 seconds, an average Gurley porosity of 7,500 seconds to 22,000 seconds, an average Gurley porosity of 10,000 seconds to 20,000 seconds, and also including an average Gurley porosity of 15,000 seconds to 20,000 seconds. In certain embodiments, the composite nonwoven mat 100 of the present disclosure has an average Gurley porosity of 1,000 seconds to 10,000 seconds, including an average Gurley porosity of 1,500 seconds to 7,500 seconds, and also including an average Gurley porosity of 2,000 seconds to 5,000 seconds.

As mentioned above, the polymer layer 20 is adhered to the first surface 12 of the nonwoven base layer 10. The extent to which the polymer layer 20 is adhered to the first surface 12 of the nonwoven base layer 10 in the composite nonwoven mat 100 may be measured by peel strength. The peel strength of the composite nonwoven mat 100 of the present disclosure may be tested using an Instron Model 3345 device (available from Instron of Norwood, Massachusetts) to carry out a T-peel test with the following parameters: load cell=100N; fixture separation=0.5 inch (12.7 mm); sample dimension=1" w×6" 1 (2.54 cm w×15.24 cm 1); and displacement rate=12 in/min (5.08 mm/s). In certain embodiments, the peel strength of the composite nonwoven mat 100 of the present disclosure is 140 gram-force to 320 gram-force, including 145 gram-force to 310 gram-force, 150 gram-force to 300 gram-force, 160 gram-force to 250 gram-force, and also including 190 gram-force to 235 gram-force.

Owing to its two different surfaces (i.e., the closed-off/sealed surface and the porous surface), the composite nonwoven mat 100 of the present disclosure may be used in a variety of applications and products. One such application relates to flooring materials. For example, flooring products such as carpet tiles and vinyl tiles may have a discontinuous or uneven layer of plastisol or polyvinyl chloride (PVC) on a backing of the tiles due to plastisol or PVC bleed-through in the manufacturing process. The composite nonwoven mat 100 of the present disclosure may be used as a backing or reinforcement for flooring materials that prevents plastisol or PVC bleed-through and provides a smooth surface (via the polymer layer 20) and allows plastisol or PVC wetting (via the nonwoven material) to form a strong bond between the composite nonwoven mat 100 and other structural portions of the flooring material, while also providing the flooring material with good dimensional stability and mechanical performance.

The composite nonwoven mat 100 of the present disclosure may also be used as a facer material for polyisocyanurate foam boards. The composite nonwoven mat 100 of the present disclosure prevents bleed-through of the polyisocyanurate foam material and provides a smooth facing surface via the polymer layer 20 and allows the polyisocyanurate foam material to wet out and form a mechanical bond to at least a portion of the nonwoven base layer 10.

In another application, the composite nonwoven mat 100 of the present disclosure may be used as a substrate for forming roofing shingles or a roofing underlayment. The polymer layer 20 of the composite nonwoven mat 100 will prevent bleed-through of the asphalt/bitumen, whereas the asphalt/bitumen can wet out and bond to the portion of the nonwoven base layer 10 that is uncoated.

In one exemplary embodiment, a method of making a composite nonwoven mat of the present disclosure is provided. The method of the present disclosure includes the steps of: a) conveying a nonwoven base layer having a first surface and a second surface; b) applying a molten polymer material onto the first surface of the nonwoven base layer as the nonwoven base layer is being conveyed; and c) allowing the molten polymer material to form a polymer layer on the first surface of the nonwoven base layer, thereby forming a composite nonwoven mat. The method of the present disclosure may be used to make any of the various embodiments of composite nonwoven mats previously described herein.

Figure 2:
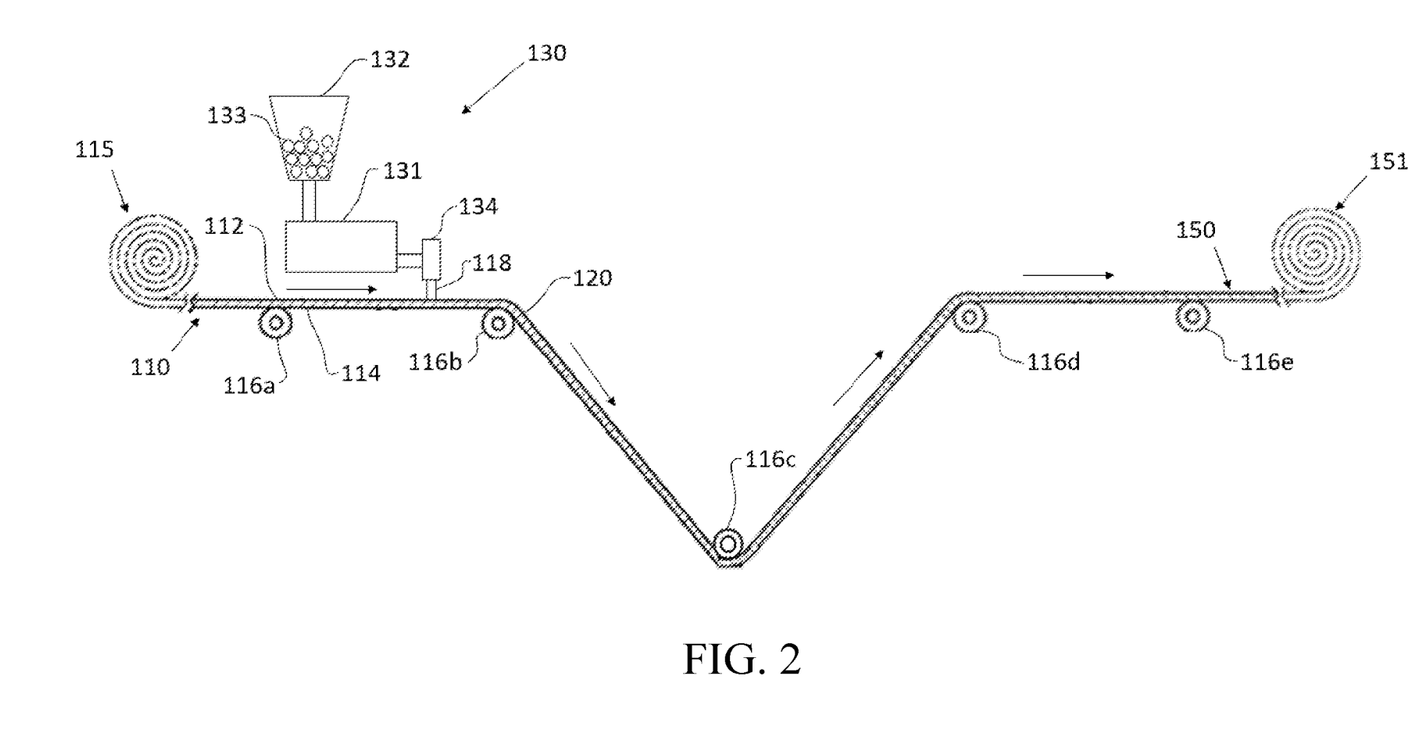
FIG. 2 is a schematic illustration of an exemplary processing line for making a composite nonwoven mat of the present disclosure.

Referring now to FIG. 2, an exemplary processing line for carrying out the method of making a composite nonwoven mat of the present disclosure is illustrated. As seen in FIG. 2, a nonwoven base layer 110 having a first surface 112 and a second surface 114 is fed from a supply roll 115 and conveyed along a processing path (shown by arrows) around a series of rollers 116a, 116b, 116c, 116d, 116e.

As the nonwoven base layer 110 is conveyed along the processing path, a molten polymer material 118 is applied to the first surface 112 of the nonwoven base layer 110. In one exemplary embodiment, the molten polymer material 118 is applied by extruding a thin film of the molten polymer material 118 onto the first surface 112 of the nonwoven base layer 110 using an extrusion system 130, as shown in FIG. 2. The extrusion system 130 includes an extruder 131 and a hopper 132 for containing and feeding a polymer material 133 (e.g., polymer pellets) to the extruder 131. The extruder 131 may be a single screw extruder or a twin screw extruder. The polymer material 133 fed to the extruder 131 is conveyed and heated by the action of the extruder screw(s) until the polymer material 133 achieves a melted or molten state. The molten polymer material 118 is then forced under pressure through an extrusion die 134 and onto the first surface 112 of the nonwoven base layer 110. The extrusion die 134 may be a slot die. In certain embodiments, the molten polymer material 118 exiting the extrusion die 134 may be at a temperature of 200° C. to 400° C., depending on the particular polymer material 133 utilized. In certain embodiments, the molten polymer material 118 exiting the extrusion die 134 may be at a temperature of 250° C. to 400° C., including a temperature of 275° C. to 400° C., and also including a temperature of 300° C. to 400° C.

The molten polymer material 118 extruded onto the first surface 112 of the nonwoven base layer 110 extends partially into the nonwoven base layer 110 (i.e., partially through a thickness of the nonwoven base layer 110 measured from the first surface 112 to the second surface 114). As the nonwoven base layer 110 continues to move along the processing path, the molten polymer material 118 solidifies to form a polymer layer 120 on the first surface 112 of the nonwoven base layer 110, thereby forming a composite nonwoven mat 150. To assist the solidification of the molten polymer material 118, one or more of the rollers 116a, 116b, 116c, 116d, 116e may be cooled (e.g., water cooled, thermoelectric cooled). As shown in FIG. 2, the composite nonwoven mat 150 may be collected by winding onto a collection roll 151.

In certain embodiments, the nonwoven base layer 110 is conveyed at a line speed of 60 ft/min (0.3 m/s) to 800 ft/min (4.1 m/s). In certain embodiments, the nonwoven base layer 110 is conveyed at a line speed of 100 ft/min (0.5 m/s) to 800 ft/min (4.1 m/s), including a lines speed of 200 ft/min (1 m/s) to 800 ft/min (4.1 m/s), a line speed of 300 ft/min (1.5 m/s) to 700 ft/min (3.6 m/s), and also including a line speed of 400 ft/min (2 m/s) to 600 ft/min (3.1 m/s). In certain embodiments, the nonwoven base layer 110 moves at a line speed in which the nonwoven base layer 110 is formed. In other words, the nonwoven base layer 110 is not provided from a roll of nonwoven material but is conveyed immediately after it is formed to the extrusion system for the application of the polymer layer in a single continuous process.

EXAMPLES

In order to more thoroughly describe the general inventive concepts, the following examples are provided.

Example 1

In this example, a Sustaina Plus™ nonwoven glass mat (available from Owens Corning Composite Materials, LLC of Toledo, Ohio) having a basis weight of about 70 g/m² was used as a nonwoven base layer to form a composite nonwoven mat. The Sustaina Plus™ nonwoven glass mat used in this example comprises glass fibers having an average fiber diameter of about 13 microns and an average fiber length of about 0.75 inches (about 19.05 mm). A layer of polypropylene was extruded onto a surface of the nonwoven base layer at a basis weight of about 30 g/m² to form the composite nonwoven mat having a basis weight of about 100 g/m². A sample of the composite nonwoven mat was tested multiple times for Gurley porosity, and the results of the testing are shown in Table 1 below.

TABLE 1

Gurley Porosity Results

| Test Number | Gurley Porosity (s) |
|---|---|
| 1 | 5,573 |
| 2 | 16,248 |
| 3 | 14,083 |
| 4 | 4,066 |
| 5 | 45,521 |
| Average | 17,098 |
| Standard Deviation | 14,968.89 |
| % RSD | 87.55 |

As seen in Table 1, the composite nonwoven mat achieved an average Gurley porosity of 17,098.2 seconds. This result indicates that the composite nonwoven mat is effectively impervious. The high standard deviation is believed to be associated with the nonuniformity of the nonwoven base layer (i.e., the nonwoven base layer contains certain portions that are more closed off or less porous than other portions, which are more open or porous).

Example 2

In this example, a VL3101 nonwoven glass mat (available from Owens Corning Composite Materials, LLC of Toledo, Ohio) having a basis weight of about 72 g/m² was used as a nonwoven base layer to form a composite nonwoven mat. The VL3101 nonwoven glass mat comprises glass fibers having an average fiber diameter of about 13.5 microns and an average fiber length of about 0.75 inches (about 19.05 mm), and a binder composition comprising a modified urea formaldehyde (90% by weight of the solids of binder composition) and acrylic (10% by weight of the solids of the binder composition). A layer of low density polyethylene was extruded onto a surface of the nonwoven base layer at a basis weight of about 35 g/m² to form a composite nonwoven mat having a basis weight of about 107 g/m². A sample of the composite nonwoven mat was tested multiple times for Gurley porosity, and the results of the testing are shown in Table 2 below.

TABLE 2

Gurley Porosity Results

| Test Number | Gurley Porosity (s) |
|---|---|
| 1 | 9,024 |
| 2 | 2,602 |
| 3 | 1,932 |
| 4 | 7,973 |
| 5 | 8,256 |
| 6 | 1,190 |
| 7 | 5,083 |
| 8 | 6,110 |
| 9 | 5,350 |
| Average | 5,280 |
| Standard Deviation | 2,707.35 |
| % RSD | 51.28 |

As seen in Table 2, the composite nonwoven mat achieved an average Gurley porosity of 5,280 seconds. This result indicates that the composite nonwoven mat is effectively impervious. The high standard deviation is believed to be associated with the nonuniformity of the nonwoven base layer (i.e., the nonwoven base layer contains certain portions that are more closed off or less porous than other portions, which are more open or porous).

Example 3

In this example, a VL3101 nonwoven glass mat (available from Owens Corning Composite Materials, LLC of Toledo, Ohio) having a basis weight of about 72 g/m² was used as a nonwoven base layer to form multiple composite nonwoven mats. The VL3101 nonwoven glass mat comprises glass fibers having an average fiber diameter of about 13.5 microns and an average fiber length of about 0.75 inches (about 19.05 mm), and a binder composition comprising a modified urea formaldehyde (90% by weight of the solids of binder composition) and acrylic (10% by weight of the solids of the binder composition).

A total of 11 samples of composite nonwoven mats were produced. The composite nonwoven mats were formed by extruding a layer of polymer material comprising 90% by weight polypropylene and 10% by weight high density polyethylene onto a surface of the nonwoven base layer. The composite nonwoven mats were tested for Gurley porosity and peel strength. The peel strength was determined using an Instron Model 3345 device to carry out a T-peel test with the following parameters: load cell=100N; fixture separation=0.5 inch (12.7 mm); sample dimension=1" w×6" 1 (2.54 cm w×15.24 cm 1); and displacement rate=12 in/min (5.08 mm/s). The results of the testing for each composite nonwoven mat are shown in Table 3 below. The Gurley porosity results presented for each sample are the average of three tests.

TABLE 3

Gurley Porosity and Peel Test Results

| Sample Number | Total Basis Weight (g/m$^2$) | Polymer Layer Basis Weight (g/m$^2$) | Gurley Porosity (s) | Peel Strength (gf) |
|---|---|---|---|---|
| 1 | 88.25 | 16.5 | 718 | 111 |
| 2 | 87.51 | 15.8 | 552 | 120 |
| 3 | 87.41 | 15.7 | 1,330 | 139 |
| 4 | 92.05 | 20.3 | 2,137 | 143 |
| 5 | 92.21 | 20.5 | 1,888 | 149 |
| 6 | 98.52 | 26.8 | 4,606 | 204 |
| 7 | 99.05 | 27.3 | 2,453 | 190 |
| 8 | 103.99 | 32.3 | 1,172 | 224 |
| 9 | 110.55 | 38.8 | 2,954 | 309 |
| 10 | 111.03 | 39.3 | 1,254 | 234 |
| 11 | 122.24 | 50.5 | 1,163 | 147 |

As seen in Table 3, the composite nonwoven mats had an average Gurley porosity ranging from 552 seconds to 4,606 seconds, and a peel strength ranging from 111 gram-force to 309 gram-force. It was observed that using a polymer layer basis weight of about 20 g/m$^2$ and higher (i.e., Samples 4-11) achieved better Gurley porosity and peel strength results than the composite nonwoven mats that featured a polymer layer having a basis weight of less than 20 g/m$^2$ (i.e., Samples 1-3). Furthermore, glass mat delamination was observed for Samples 8-11. Glass mat delamination indicates that the polymer layer is strongly adhered (mechanically locked) to the nonwoven base layer, so much so that the nonwoven base layer itself begins to come apart or delaminate.

Example 4

In this example, a Sustaina Plus™ nonwoven glass mat (available from Owens Corning Composite Materials, LLC of Toledo, Ohio) having a basis weight of about 60 g/m$^2$ was used as a nonwoven base layer to form composite nonwoven mats. The Sustaina Plus' nonwoven glass mat used in this example comprises glass fibers having an average fiber diameter of about 13 microns and an average fiber length of about 0.75 inches (about 19.05 mm).

A total of 10 samples of composite nonwoven mats were produced. The composite nonwoven mats were formed by extruding a layer of polymer material comprising 90% by weight polypropylene and 10% by weight high density polyethylene onto a surface of the nonwoven base layer. The composite nonwoven mats were tested for Gurley porosity, and the results for each composite nonwoven mat sample are shown in Table 4 below. The Gurley porosity results represent the average of three tests.

TABLE 4

Gurley Porosity Test Results

| Sample Number | Total Basis Weight (g/m$^2$) | Polymer Layer Basis Weight (g/m$^2$) | Gurley Porosity (s) |
|---|---|---|---|
| 1 | 75.07 | 16.43 | 592 |
| 2 | 76.90 | 18.26 | 1,512 |
| 3 | 81.27 | 22.64 | 1,502 |
| 4 | 83.73 | 25.09 | 7,474 |
| 5 | 86.87 | 28.23 | 7,490 |
| 6 | 90.62 | 31.99 | 4,027 |
| 7 | 95.78 | 37.15 | 16,635 |
| 8 | 95.91 | 37.28 | 7,157 |
| 9 | 98.64 | 40.00 | 2,055 |
| 10 | 99.92 | 41.29 | 7,250 |

As seen in Table 4, the composite nonwoven mats had an average Gurley porosity ranging from 592 seconds to 16,635 seconds. It was observed that using a polymer layer basis weight of about 25 g/m$^2$ and higher (i.e., Samples 4-10) achieved better Gurley porosity results (i.e., at least 2,000 seconds) than the composite nonwoven mats that featured a polymer layer having a basis weight of less than 25 g/m$^2$ (i.e., Samples 1-3).

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The composite nonwoven mats of the present disclosure can comprise, consist of, or consist essentially of the essential elements and limitations of the disclosure as described herein, as well as any additional or optional components or limitations described herein or otherwise useful in nonwoven mat applications.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

What is claimed is:

1. A composite nonwoven mat comprising:
   a nonwoven base layer comprising:
   glass fibers having an average diameter of from about 13 microns to about 16 microns; and
   a binder composition coating at least a portion of the glass fibers, the binder composition comprising:
   a binder resin material,
   a coupling agent, and
   optionally one or more additives;
   wherein the nonwoven base layer has a first surface and a second, opposing surface; and
   a polymer layer adhered to the first surface, wherein the polymer layer comprises at least 97 wt. % of a polymer material;
   wherein the polymer layer seals the first surface such that it prevents bleed-through of liquid/flowable material and is impervious to air;
   wherein the polymer layer extends partially into the nonwoven base layer;
   wherein the nonwoven base layer has a basis weight of 30 g/m$^2$ to 200 g/m$^2$ and the polymer layer has a basis weight of 10 g/m$^2$ to 100 g/m$^2$;
   wherein the second surface is porous and permits penetration by liquid/flowable material; and
   wherein the composite nonwoven mat has an average Gurley porosity of 1,000 seconds to 30,000 seconds.

2. The composite nonwoven mat of claim 1, wherein the polymer layer comprises one or more of a polyolefin, a polyester, a polyamide, a polyimide, a polyacrylate, and a polyurethane.

3. The composite nonwoven mat of claim 1, wherein the polymer layer comprises one or more of a polyethylene, a polypropylene, and a polymethacrylate.

4. The composite nonwoven mat of claim 1, wherein the polymer layer comprises one or more additives in an amount of less than 3% by weight of the polymer layer, and wherein the additives comprise one or more of a fire retardant, a dye, a pigment, a UV stabilizer, an anti-static agent, and a filler.

5. The composite nonwoven mat of claim 1, wherein the second surface of the nonwoven base layer is free of the polymer layer.

6. A flooring material comprising a composite nonwoven mat according to claim 1.

7. A polyisocyanurate foam board comprising at least one facer, wherein the at least one facer comprises a composite nonwoven mat according to claim 1.

8. A composite nonwoven mat comprising:
   a nonwoven base layer comprising:
   glass fibers;
   a plurality of additional fibers selected from polyester fibers, polyethylene fibers, polypropylene fibers, and polyethylene terephthalate fibers; and
   a binder composition coating at least a portion of the glass fibers and the plurality of additional fibers, the binder composition comprising:
   a binder resin material,
   a coupling agent, and
   optionally one or more additives,
   wherein the nonwoven base layer has a first surface and a second, opposing surface; and
   a polymer layer adhered to the first surface, wherein the polymer layer comprises at least 97 wt. % of a polymer material;
   wherein the polymer layer seals the first surface such that it prevents bleed-through of liquid/flowable material and is impervious to air;
   wherein the polymer layer extends partially into the nonwoven base layer;
   wherein the second surface is porous and permits penetration by liquid/flowable material;
   wherein the only binder composition in the nonwoven base layer is the binder composition that is coating at least a portion of the glass fibers and the plurality of additional fibers; and
   wherein the composite nonwoven mat has an average Gurley porosity of 1,000 seconds to 30,000 seconds.

* * * * *